United States Patent
Hart et al.

(10) Patent No.: US 8,961,355 B2
(45) Date of Patent: Feb. 24, 2015

(54) METHOD FOR CONTROLLING A MULTI-SPEED TRANSMISSION HAVING FOUR PLANETARY GEAR SETS FOR PRODUCING AT LEAST NINE GEAR SPEEDS

(75) Inventors: James M. Hart, Belleville, MI (US); Bret M. Olson, Whitelake, MI (US); Scott H. Wittkopp, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 418 days.

(21) Appl. No.: 13/187,654

(22) Filed: Jul. 21, 2011

(65) Prior Publication Data

US 2013/0023376 A1 Jan. 24, 2013

(51) Int. Cl.
*F16H 3/62* (2006.01)

(52) U.S. Cl.
USPC .......................................................... 475/275

(58) Field of Classification Search
USPC .................................................. 475/275–279
See application file for complete search history.

(56) References Cited

U.S. PATENT DOCUMENTS

| | | | |
|---|---|---|---|
| 5,800,303 A * | 9/1998 | Benford | 475/276 |
| 6,176,803 B1 | 1/2001 | Meyer et al. | |
| 6,558,287 B2 | 5/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 8,360,925 B2 * | 1/2013 | Kraynev et al. | 475/277 |
| 8,460,150 B2 * | 6/2013 | Kraynev et al. | 475/275 |
| 2005/0090362 A1 | 4/2005 | Abe et al. | |
| 2008/0207380 A1* | 8/2008 | Raghavan et al. | 475/275 |
| 2011/0251014 A1 | 10/2011 | Leesch et al. | |

FOREIGN PATENT DOCUMENTS

DE     10 2008 055 626     * 5/2010

* cited by examiner

*Primary Examiner* — Sherry Estremsky

(57) ABSTRACT

A transmission of the present invention has an input member, an output member, four planetary gear sets, a plurality of coupling members and a plurality of torque transmitting devices. Each of the planetary gear sets includes first, second and third members. The torque transmitting devices include clutches and brakes. A method for controlling the transmission selectively engages the torque transmitting devices in combinations of at least two to establish at least nine forward speed ratios and at least one reverse speed ratio.

11 Claims, 1 Drawing Sheet

Figures 1, 2:
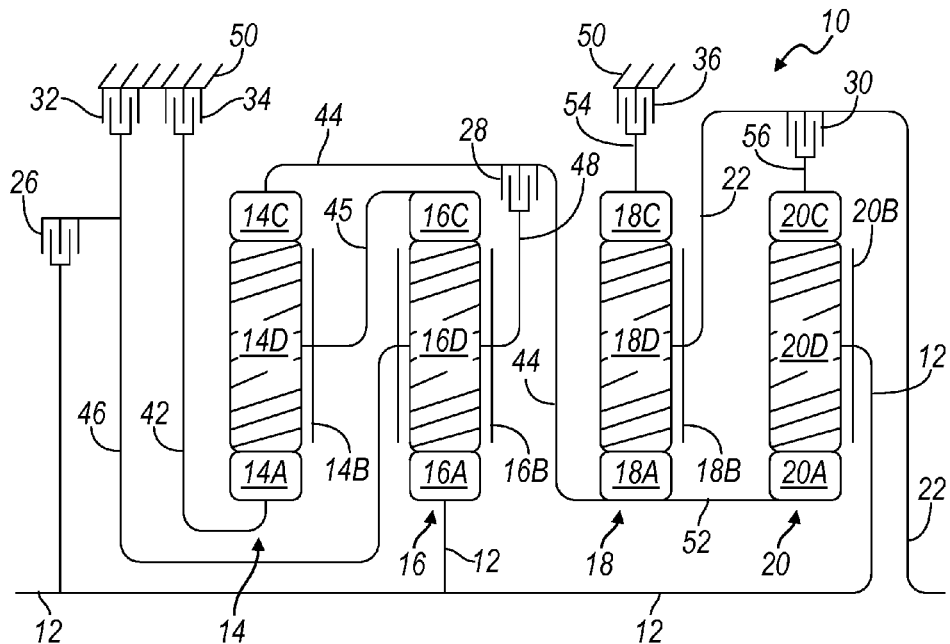

| GEAR STATE | GEAR RATIO | RATIO STEP | TORQUE TRANSMITTING ELEMENTS | | | | | |
|---|---|---|---|---|---|---|---|---|
| | | | 32 | 34 | 36 | 28 | 26 | 30 |
| REV | -4.935 | | X | X | X | | | |
| N | | -0.90 | | O | O | | | |
| 1ST | 5.503 | | | X | X | X | | |
| 2ND | 3.333 | 1.65 | | | X | X | X | |
| 3RD | 2.315 | 1.44 | X | X | | | X | |
| 4TH | 1.660 | 1.39 | | O | X | | | X |
| 4TH | 1.660 | 1.39 | | | X | | O | X |
| 4TH | 1.660 | 1.39 | O | | X | | | X |
| 4TH | 1.660 | 1.39 | | | X | O | | X |
| 5TH | 1.210 | 1.45 | | X | | | X | X |
| 6TH | 1.000 | 1.66 | | | | X | X | X |
| 7TH | 0.865 | 1.16 | | X | | X | | X |
| 8TH | 0.717 | 1.21 | X | | | X | | X |
| 9TH | 0.602 | 1.19 | X | X | | | | X |

X = ON - ENGAGED CARRYING TORQUE
O = ON - ENGAGED NOT CARRYING TORQUE

METHOD FOR CONTROLLING A MULTI-SPEED TRANSMISSION HAVING FOUR PLANETARY GEAR SETS FOR PRODUCING AT LEAST NINE GEAR SPEEDS

FIELD

The invention relates generally to a multiple speed transmission having a plurality of planetary gear sets and a plurality of torque transmitting devices, and more particularly to a method for controlling transmission having nine or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling or interconnecting members and a plurality of torque transmitting devices. Each of the planetary gear sets includes first, second and third members. The torque transmitting devices are for example clutches and brakes.

In another embodiment of the present invention, a method for controlling a transmission is provided. The method includes providing an input member, providing an output member, providing a first, second, third and fourth planetary gear sets each having first, second and third members, providing a first interconnecting member for continuously interconnecting the third member of the first planetary gear set with first members of the third and fourth planetary gear sets, providing a second interconnecting member for continuously interconnecting the second member of the first planetary gear set with the third member of the second planetary gear set, providing a third interconnecting member for continuously interconnecting the first member of the second planetary gear set and the input member with the second member of the fourth planetary gear set, providing a first torque transmitting device to selectively interconnect the input member, the first member of the second planetary gear set and second member of the fourth planetary gear set with the second member of the second planetary gear set, providing a second torque transmitting device to selectively interconnect the second member of the second planetary gear set with the third member of the first planetary gear set and the first members of the third and fourth planetary gear sets, providing a third torque transmitting device to selectively to interconnect the second member of the third planetary gear set and the output member with the third member of the fourth planetary gear set, providing a fourth torque transmitting device to selectively to interconnect the second member of the second planetary gear set with the stationary member, providing a fifth torque transmitting device to selectively interconnect the first member of the first planetary gear set with the stationary member, and providing a sixth torque transmitting device to selectively interconnect the third member of the third planetary gear set with the stationary member.

In yet another embodiment of the present invention, the method further includes establishing a first forward speed ratio by selectively activating the second, the fifth and the sixth torque transmitting devices.

In yet another embodiment of the present invention, the method further includes establishing a second forward speed ratio by selectively activating the first, the second and the sixth torque transmitting devices.

In yet another embodiment of the present invention, the method further includes establishing a third forward speed ratio by selectively activating the first, the fifth and the sixth torque transmitting devices.

In still another embodiment of the present invention, the method further includes establishing a fourth forward speed ratio by selectively activating the third and the sixth torque transmitting devices and at least one of the first, second, the fourth and the fifth torque transmitting devices.

In still another embodiment of the present invention, the method further includes establishing a fifth forward speed ratio by selectively activating the first, the third and the fifth torque transmitting devices.

In still another embodiment of the present invention, the method further includes establishing a sixth forward speed ratio by selectively activating the first, the second and the third torque transmitting devices.

In still another embodiment of the present invention, the method further includes establishing a seventh forward speed ratio by selectively activating the second, the third and the fifth torque transmitting devices.

In still another embodiment of the present invention, the method further includes establishing an eighth forward speed ratio by selectively activating the second, the third and the fourth torque transmitting devices.

In still another embodiment of the present invention, the method further includes establishing a ninth forward speed ratio by selectively activating the third, the fourth and the fifth torque transmitting devices.

In still another embodiment of the present invention, the method further includes establishing a reverse speed ratio by selectively activating the fourth, the fifth and the sixth torque transmitting devices.

In still another embodiment of the present invention, the method further includes establishing a fourth forward speed ratio by selectively activating at least the third and the sixth torque transmitting devices.

In still another embodiment of the present invention, the method further includes establishing a fourth forward speed ratio by selectively activating the third, the fifth and the sixth torque transmitting device.

In still another embodiment of the present invention, the method further includes establishing a fourth forward speed ratio by selectively activating the first, the third and the sixth torque transmitting device.

In still another embodiment of the present invention, the method further includes establishing a fourth forward speed ratio by selectively activating the third, the fourth and the sixth torque transmitting device.

In still another embodiment of the present invention, the method further includes establishing a fourth forward speed ratio by selectively activating the second, the third and the sixth torque transmitting device.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 1 is a diagrammatic view of an embodiment of a nine speed transmission according to the present invention; and FIG. 2 is a truth table presenting the state of engagement of the various torque transmitting elements in each of the available forward and reverse speeds or gear ratios of the transmission illustrated in FIG. 1.

DETAILED DESCRIPTION

The following description is merely exemplary in nature and is not intended to limit the present disclosure, application, or uses.

Referring now to FIG. 1, a stick diagram presents a schematic layout of the embodiment of the nine speed transmission 10 according to the present invention. The transmission 10 includes an input shaft or member 12, a first planetary gear set 14, a second planetary gear set 16, a third planetary gear set 18 and a fourth planetary gear set 20 and an output shaft or member 22.

The planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42. The ring gear member 14C is connected for common rotation with a second shaft or interconnecting member 44. The planet carrier member 14B is also connected for common rotation with the third shaft or interconnecting member 45. The planet gears 14D are each configured to intermesh with both the sun gear member 14A and the ring gear member 14C.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the input member 12. The ring gear member 16C is connected for common rotation with the third shaft or interconnecting member 45. The planet carrier member 16B is connected for common rotation with a fourth shaft or interconnecting member 46 and with a fifth shaft or interconnecting member 48. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with the second shaft or interconnecting member 44 and a sixth shaft or interconnecting member 52. The ring gear member 18C is connected for common rotation with a seventh shaft or interconnecting member 54. The planet carrier member 18B is connected for common rotation with the output shaft 22. The planet gears 18D are each configured to intermesh with both the sun gear member 18A and the ring gear member 18C.

The planetary gear set 20 includes a sun gear member 20A, a ring gear member 20B and a planet gear carrier member 20C that rotatably supports a set of planet gears 20D (only one of which is shown). The sun gear member 20A is connected for common rotation with the sixth shaft or interconnecting member 52. The ring gear member 20C is connected for common rotation with an eighth shaft or interconnecting member 56. The planet carrier member 20B is connected for common rotation with the input shaft 12. The set of planet gears 20D are each configured to intermesh with both the sun gear member 20A and the ring gear member 20C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or the clutches 26, 28, 30 and the brakes 32, 34 and 36 allow for selective interconnection of the shafts or interconnecting members, members of the planetary gear sets and the housing. For example, the first clutch 26 is selectively engageable to connect the input shaft or member 12 with the fourth shaft or interconnecting member 46. The second clutch 28 is selectively engageable to connect the second shaft or interconnecting member 44 with the fifth shaft or interconnecting member 48. The third clutch 30 is selectively engageable to connect the eighth shaft or interconnecting member 56 with the output shaft or member 22. The first brake 32 is selectively engageable to connect the fourth shaft or interconnecting member 46 with the stationary element or the transmission housing 50 in order to prevent the fourth shaft or interconnecting member 46 from rotating relative to the transmission housing 50. The second brake 34 is selectively engageable to connect the first shaft or interconnecting member 42 with a stationary element or the transmission housing 50 in order to prevent the first shaft or interconnecting member 42 from rotating relative to the transmission housing 50. The third brake 36 is selectively engageable to connect the seventh shaft or interconnecting member 54 with a stationary element or the transmission housing 50 in order to prevent the seventh shaft or interconnecting member 54 from rotating relative to the transmission housing 50.

Referring now to FIGS. 1 and 2, the operation of or method for controlling the embodiment of the nine speed transmission 10 will be described. It will be appreciated that the transmission 10 is capable of transmitting torque from the input shaft or member 12 to the output shaft or member 22 in at least nine forward speed or torque ratios and at least one reverse speed or torque ratio with a triple overdrive. Each forward and reverse speed or torque ratio is attained by engagement of one or more of the torque-transmitting mechanisms (i.e. first clutch 26, second clutch 28, third clutch 30, first brake 32, second brake 34 and third brake 36), as will be explained below. FIG. 2 is a truth table presenting the various combinations of torque-transmitting elements that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 2. Of course, other gear ratios are achievable depending on the gear diameter, gear teeth count and gear configuration selected.

To establish reverse gear, the first brake 32, the second brake 34 and the third brake 36 are engaged or activated. The first brake 32 connects the fourth shaft or interconnecting member 46 with a stationary element or the transmission housing 50 in order to prevent the fourth shaft or interconnecting member 46 from rotating relative to the transmission housing 50. The second brake 34 connects the first shaft or interconnecting member 42 with a stationary element or the transmission housing 50 in order to prevent the first shaft or interconnecting member 42 from rotating relative to the transmission housing 50. The third brake 36 connects the seventh shaft or interconnecting member 54 with a stationary element or the transmission housing 50 in order to prevent the seventh shaft or interconnecting member 54 from rotating relative to the transmission housing 50.

To establish a first gear ratio, the second clutch 28, the second brake 34 and the third brake 36 are engaged or activated. The second clutch 28 connects the second shaft or interconnecting member 44 with the fifth shaft or interconnecting member 48. The second brake 34 connects the first shaft or interconnecting member 42 with a stationary element or the transmission housing 50 in order to prevent the first shaft or interconnecting member 42 from rotating relative to the transmission housing 50. The third brake 36 connects the seventh shaft or interconnecting member 54 with a stationary element or the transmission housing 50 in order to prevent the seventh shaft or interconnecting member 54 from rotating relative to the transmission housing 50.

To establish a second gear ratio, the first clutch 26, the second clutch 28 and the third brake 36 are engaged or activated. The first clutch 26 connects the input shaft or member 12 with the fourth shaft or interconnecting member 46. The second clutch 28 connects the second shaft or interconnecting member 44 with the fifth shaft or interconnecting member 48. The third brake 36 connects the seventh shaft or interconnecting member 54 with a stationary element or the transmission housing 50 in order to prevent the seventh shaft or interconnecting member 54 from rotating relative to the transmission housing 50.

To establish a third gear ratio, the first clutch 26, the second brake 34 and the third brake 36 are engaged or activated. The first clutch 26 connects the input shaft or member 12 with the fourth shaft or interconnecting member 46. The second brake 34 connects the first shaft or interconnecting member 42 with a stationary element or the transmission housing 50 in order to prevent the first shaft or interconnecting member 42 from rotating relative to the transmission housing 50. The third brake 36 connects the seventh shaft or interconnecting member 54 with a stationary element or the transmission housing 50 in order to prevent the seventh shaft or interconnecting member 54 from rotating relative to the transmission housing 50.

To establish a fourth gear ratio, the third clutch 30 and the third brake 36 are engaged or activated. The third clutch 30 connects the eighth shaft or interconnecting member 56 with the output shaft or member 22. The third brake 36 connects the seventh shaft or interconnecting member 54 with a stationary element or the transmission housing 50 in order to prevent the seventh shaft or interconnecting member 54 from rotating relative to the transmission housing 50. Moreover, the second brake 34 may be engaged or activated but will be carrying zero torque. The engagement of second brake 34 is not required to establish the fourth gear or speed ratio. The second brake 34 connects the first shaft or interconnecting member 42 with a stationary element or the transmission housing 50 in order to prevent the first shaft or interconnecting member 42 from rotating relative to the transmission housing 50.

To establish an alternative fourth gear ratio, the third clutch 30 and the third brake 36 are engaged or activated. The third clutch 30 connects the eighth shaft or interconnecting member 56 with the output shaft or member 22. The third brake 36 connects the seventh shaft or interconnecting member 54 with a stationary element or the transmission housing 50 in order to prevent the seventh shaft or interconnecting member 54 from rotating relative to the transmission housing 50. Moreover, the first clutch 26 may be engaged or activated but will be carrying zero torque. The engagement of the first clutch 26 is not required to establish the fourth gear or speed ratio. The first clutch 26 connects the input shaft or member 12 with the fourth shaft or interconnecting member 46.

To establish yet another alternative fourth gear ratio, the third clutch 30 and the third brake 36 are engaged or activated. The third clutch 30 connects the eighth shaft or interconnecting member 56 with the output shaft or member 22. The third brake 36 connects the seventh shaft or interconnecting member 54 with a stationary element or the transmission housing 50 in order to prevent the seventh shaft or interconnecting member 54 from rotating relative to the transmission housing 50. Moreover, the first brake 32 may be engaged or activated but will be carrying zero torque. The engagement of the first brake 32 is not required to establish the fourth gear or speed ratio. The first brake 32 connects the fourth shaft or interconnecting member 46 with the stationary element or the transmission housing 50 in order to prevent the fourth shaft or interconnecting member 46 from rotating relative to the transmission housing 50.

To establish yet another alternative fourth gear ratio, the third clutch 30 and the third brake 36 are engaged or activated. The third clutch 30 connects the eighth shaft or interconnecting member 56 with the output shaft or member 22. The third brake 36 connects the seventh shaft or interconnecting member 54 with a stationary element or the transmission housing 50 in order to prevent the seventh shaft or interconnecting member 54 from rotating relative to the transmission housing 50. Moreover, the second clutch 28 may be engaged or activated but will be carrying zero torque. The engagement of the second clutch 28 is not required to establish the fourth gear or speed ratio. The second clutch 28 connects the second shaft or interconnecting member 44 with the fifth shaft or interconnecting member 48.

To establish a fifth gear ratio, the first clutch 26, the third clutch 30 and the second brake 34 are engaged or activated. The first clutch 26 connects the input shaft or member 12 with the fourth shaft or interconnecting member 46. The third clutch 30 connects the eighth shaft or interconnecting member 56 with the output shaft or member 22. The second brake 34 connects the first shaft or interconnecting member 42 with a stationary element or the transmission housing 50 in order to prevent the first shaft or interconnecting member 42 from rotating relative to the transmission housing 50.

To establish a sixth gear ratio, the first clutch 26, the second clutch 28 and the third clutch 30 are engaged or activated. The first clutch 26 connects the input shaft or member 12 with the fourth shaft or interconnecting member 46. The second clutch 28 connects the second shaft or interconnecting member 44 with the fifth shaft or interconnecting member 48. The third clutch 30 connects the eighth shaft or interconnecting member 56 with the output shaft or member 22.

To establish a seventh gear ratio, the second clutch 28, the third clutch 30 and the second brake 34 are engaged or activated. The second clutch 28 connects the second shaft or interconnecting member 44 with a fifth shaft or interconnecting member 48. The third clutch 30 connects the eighth shaft or interconnecting member 56 with the output shaft or member 22. The second brake 34 connects the first shaft or interconnecting member 42 with a stationary element or the transmission housing 50 in order to prevent the first shaft or interconnecting member 42 from rotating relative to the transmission housing 50.

To establish an eighth gear ratio, the second clutch 28, the third clutch 30 and the first brake 32 are engaged or activated. The second clutch 28 connects the second shaft or interconnecting member 44 with the fifth shaft or interconnecting member 48. The third clutch 30 connects the eighth shaft or interconnecting member 56 with the output shaft or member 22. The first brake 32 connects the fourth shaft or interconnecting member 46 with the stationary element or the transmission housing 50 in order to prevent the fourth shaft or interconnecting member 46 from rotating relative to the transmission housing 50.

To establish a ninth gear ratio, the third clutch 30, the first brake 32 and the second brake 34 are engaged or activated. The third clutch 30 connects the eighth shaft or interconnecting member 56 with the output shaft or member 22. The first brake 32 connects the fourth shaft or interconnecting member 46 with the stationary element or the transmission housing 50 in order to prevent the fourth shaft or interconnecting member 46 from rotating relative to the transmission housing 50. The second brake 34 connects the first shaft or interconnecting member 42 with a stationary element or the transmission housing 50 in order to prevent the first shaft or interconnecting member 42 from rotating relative to the transmission housing 50.

It will be appreciated that the foregoing explanation of operation and gear states of the nine speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for controlling a transmission, the method comprising:
   providing an input member;
   providing an output member;
   providing first, second, third and fourth planetary gear sets each having first, second and third members;
   providing a first interconnecting member for continuously interconnecting the third member of the first planetary gear set with first members of the third and fourth planetary gear sets;
   providing a second interconnecting member for continuously interconnecting the second member of the first planetary gear set with the third member of the second planetary gear set;
   providing a third interconnecting member for continuously interconnecting the first member of the second planetary gear set and the input member with the second member of the fourth planetary gear set;
   providing a first torque transmitting device to selectively interconnect the input member, the first member of the second planetary gear set and second member of the fourth planetary gear set with the second member of the second planetary gear set;
   providing a second torque transmitting device to selectively interconnect the second member of the second planetary gear set with the third member of the first planetary gear set and the first members of the third and fourth planetary gear sets;
   providing a third torque transmitting device to selectively interconnect the second member of the third planetary gear set and the output member with the third member of the fourth planetary gear set;
   providing a fourth torque transmitting device to selectively interconnect the second member of the second planetary gear set with a stationary member;
   providing a fifth torque transmitting device to selectively interconnect the first member of the first planetary gear set with the stationary member;
   providing a sixth torque transmitting device to selectively interconnect the third member of the third planetary gear set with the stationary member;
   establishing a first forward speed ratio by selectively activating the second, the fifth and the sixth torque transmitting devices;
   establishing a second forward speed ratio by selectively activating the first, the second and the sixth torque transmitting devices;
   establishing a third forward speed ratio by selectively activating the first, the fifth and the sixth torque transmitting devices;
   establishing a fourth forward speed ratio by selectively activating the third, the fourth and the sixth torque transmitting device;
   establishing a fifth forward speed ratio by selectively activating the first, the third and the fifth torque transmitting devices;
   establishing a sixth forward speed ratio by selectively activating the first, the second and the third torque transmitting devices;
   establishing a seventh forward speed ratio by selectively activating the second, the third and the fifth torque transmitting devices;
   establishing an eighth forward speed ratio by selectively activating the second, the third and the fourth torque transmitting devices;
   establishing a ninth forward speed ratio by selectively activating the third, the fourth and the fifth torque transmitting devices; and
   establishing a reverse speed ratio by selectively activating the fourth, the fifth and the sixth torque transmitting devices.

2. The method of claim 1 wherein providing a first, second, third and fourth planetary gear sets each having first, second and third members further comprises providing the first member of the first planetary gear set, the first member of the second planetary gear set, the first member of the third planetary gear set and the first member of the fourth planetary gear set as sun gears, the second member of the first planetary gear set, the second member of the second planetary gear set, the second member of the third planetary gear set and the second member of the fourth planetary gear set as carrier members and the third member of the first planetary gear set, third member of the second planetary gear set, the third member of the third planetary gear set and the third member of the fourth planetary gear set as ring gears.

3. The method of claim 1 wherein providing an input member further comprises providing an input member continuously interconnected with the first member of the second planetary gear set and the second member of the fourth planetary gear set.

4. The method of claim 1 wherein providing an output member further comprises providing output member continuously interconnected with the second member of the third planetary gear set.

5. A method for controlling a transmission, the method comprising:
providing an input member;
providing an output member;
providing first, second, third and fourth planetary gear sets each having first, second and third members;
providing a first interconnecting member for continuously interconnecting the third member of the first planetary gear set with first members of the third and fourth planetary gear sets;
providing a second interconnecting member for continuously interconnecting the second member of the first planetary gear set with the third member of the second planetary gear set;
providing a third interconnecting member for continuously interconnecting the first member of the second planetary gear set and the input member with the second member of the fourth planetary gear set;
providing a first torque transmitting device to selectively interconnect the input member, the first member of the second planetary gear set and second member of the fourth planetary gear set with the second member of the second planetary gear set;
providing a second torque transmitting device to selectively interconnect the second member of the second planetary gear set with the third member of the first planetary gear set and the first members of the third and fourth planetary gear sets;
providing a third torque transmitting device to selectively interconnect the second member of the third planetary gear set and the output member with the third member of the fourth planetary gear set;
providing a fourth torque transmitting device to selectively interconnect the second member of the second planetary gear set with a stationary member;
providing a fifth torque transmitting device to selectively interconnect the first member of the first planetary gear set with the stationary member;
providing a sixth torque transmitting device to selectively interconnect the third member of the third planetary gear set with the stationary member;
establishing a first forward speed ratio by selectively activating the second, the fifth and the sixth torque transmitting devices;
establishing a second forward speed ratio by selectively activating the first, the second and the sixth torque transmitting devices;
establishing a third forward speed ratio by selectively activating the first, the fifth and the sixth torque transmitting devices;
establishing a fourth forward speed ratio by selectively activating the second, the third and the sixth torque transmitting device
establishing a fifth forward speed ratio by selectively activating the first, the third and the fifth torque transmitting devices;
establishing a sixth forward speed ratio by selectively activating the first, the second and the third torque transmitting devices;
establishing a seventh forward speed ratio by selectively activating the second, the third and the fifth torque transmitting devices;
establishing an eighth forward speed ratio by selectively activating the second, the third and the fourth torque transmitting devices;
establishing a ninth forward speed ratio by selectively activating the third, the fourth and the fifth torque transmitting devices; and
establishing a reverse speed ratio by selectively activating the fourth, the fifth and the sixth torque transmitting devices.

6. The method of claim 5 wherein providing a first, second, third and fourth planetary gear sets each having first, second and third members further comprises providing the first member of the first planetary gear set, the first member of the second planetary gear set, the first member of the third planetary gear set and the first member of the fourth planetary gear set as sun gears, the second member of the first planetary gear set, the second member of the second planetary gear set, the second member of the third planetary gear set and the second member of the fourth planetary gear set as carrier members and the third member of the first planetary gear set, third member of the second planetary gear set, the third member of the third planetary gear set and the third member of the fourth planetary gear set as ring gears.

7. The method of claim 5 wherein providing an input member further comprises providing an input member continuously interconnected with the first member of the second planetary gear set and the second member of the fourth planetary gear set.

8. The method of claim 5 wherein providing an output member further comprises providing output member continuously interconnected with the second member of the third planetary gear set.

9. A method for controlling a transmission, the method comprising:
providing a first, second, third and fourth planetary gear sets each having a sun gear, a carrier member and a ring gear;
providing an input member continuously interconnected with the sun gear of the second planetary gear set and the carrier member of the fourth planetary gear set;
providing an output member continuously interconnected with the carrier member of the third planetary gear set;
providing a first interconnecting member for continuously interconnecting the ring gear of the first planetary gear set with sun gears of the third and fourth planetary gear sets;
providing a second interconnecting member for continuously interconnecting the carrier member of the first planetary gear set with the ring gear of the second planetary gear set;
providing a third interconnecting member for continuously interconnecting the sun gear of the second planetary gear set and the input member with the carrier member of the fourth planetary gear set;
providing a first torque transmitting device to selectively interconnect the input member, the sun gear of the second planetary gear set and carrier member of the fourth planetary gear set with the carrier member of the second planetary gear set;
providing a second torque transmitting device to selectively interconnect the carrier member of the second planetary gear set with the ring gear of the first planetary gear set and the sun gears of the third and fourth planetary gear sets;

providing a third torque transmitting device to selectively interconnect the carrier member of the third planetary gear set and the output member with the ring gear of the fourth planetary gear set;

providing a fourth torque transmitting device to selectively interconnect the carrier member of the second planetary gear set with a stationary portion of a housing of the transmission;

providing a fifth torque transmitting device to selectively interconnect the sun gear of the first planetary gear set with a stationary portion of the housing of the transmission;

providing a sixth torque transmitting device to selectively interconnect the ring gear of the third planetary gear set with a stationary portion of the housing of the transmission;

establishing a first forward speed ratio by selectively activating the second, the fifth and the sixth torque transmitting devices;

establishing a second forward speed ratio by selectively activating the first, the second and the sixth torque transmitting devices;

establishing a third forward speed ratio by selectively activating the first, the fifth and the sixth torque transmitting devices;

establishing a fourth forward speed ratio by selectively activating only the third and the sixth torque transmitting devices wherein only the third and sixth torque transmitting devices transmit torque;

establishing a fifth forward speed ratio by selectively activating the first, the third and the fifth torque transmitting devices;

establishing a sixth forward speed ratio by selectively activating the first, the second and the third torque transmitting devices;

establishing a seventh forward speed ratio by selectively activating the second, the third and the fifth torque transmitting devices;

establishing an eighth forward speed ratio by selectively activating the second, the third and the fourth torque transmitting devices;

establishing a ninth forward speed ratio by selectively activating the third, the fourth and the fifth torque transmitting devices; and establishing a reverse speed ratio by selectively activating the fourth, the fifth and the sixth torque transmitting devices.

10. A method for controlling a transmission, the method comprising:

providing a first, second, third and fourth planetary gear sets each having a sun gear, a carrier member and a ring gear;

providing an input member continuously interconnected with the sun gear of the second planetary gear set and the carrier member of the fourth planetary gear set;

providing an output member continuously interconnected with the carrier member of the third planetary gear set;

providing a first interconnecting member for continuously interconnecting the ring gear of the first planetary gear set with sun gears of the third and fourth planetary gear sets;

providing a second interconnecting member for continuously interconnecting the carrier member of the first planetary gear set with the ring gear of the second planetary gear set;

providing a third interconnecting member for continuously interconnecting the sun gear of the second planetary gear set and the input member with the carrier member of the fourth planetary gear set;

providing a first torque transmitting device to selectively interconnect the input member, the sun gear of the second planetary gear set and carrier member of the fourth planetary gear set with the carrier member of the second planetary gear set;

providing a second torque transmitting device to selectively interconnect the carrier member of the second planetary gear set with the ring gear of the first planetary gear set and the sun gears of the third and fourth planetary gear sets;

providing a third torque transmitting device to selectively interconnect the carrier member of the third planetary gear set and the output member with the ring gear of the fourth planetary gear set;

providing a fourth torque transmitting device to selectively interconnect the carrier member of the second planetary gear set with a stationary portion of a housing of the transmission;

providing a fifth torque transmitting device to selectively interconnect the sun gear of the first planetary gear set with a stationary portion of the housing of the transmission;

providing a sixth torque transmitting device to selectively interconnect the ring gear of the third planetary gear set with a stationary portion of the housing of the transmission;

establishing a first forward speed ratio by selectively activating the second, the fifth and the sixth torque transmitting devices;

establishing a second forward speed ratio by selectively activating the first, the second and the sixth torque transmitting devices;

establishing a third forward speed ratio by selectively activating the first, the fifth and the sixth torque transmitting devices;

establishing a fourth forward speed ratio by selectively activating the third, the fourth and the sixth torque transmitting devices wherein the third and sixth torque transmitting devices transmit torque and the fourth torque transmitting device carries zero torque;

establishing a fifth forward speed ratio by selectively activating the first, the third and the fifth torque transmitting devices;

establishing a sixth forward speed ratio by selectively activating the first, the second and the third torque transmitting devices;

establishing a seventh forward speed ratio by selectively activating the second, the third and the fifth torque transmitting devices;

establishing an eighth forward speed ratio by selectively activating the second, the third and the fourth torque transmitting devices;

establishing a ninth forward speed ratio by selectively activating the third, the fourth and the fifth torque transmitting devices; and establishing a reverse speed ratio by selectively activating the fourth, the fifth and the sixth torque transmitting devices.

11. A method for controlling a transmission, the method comprising:

providing a first, second, third and fourth planetary gear sets each having a sun gear, a carrier member and a ring gear;

providing an input member continuously interconnected with the sun gear of the second planetary gear set and the carrier member of the fourth planetary gear set;

providing an output member continuously interconnected with the carrier member of the third planetary gear set;

providing a first interconnecting member for continuously interconnecting the ring gear of the first planetary gear set with sun gears of the third and fourth planetary gear sets;

providing a second interconnecting member for continuously interconnecting the carrier member of the first planetary gear set with the ring gear of the second planetary gear set;

providing a third interconnecting member for continuously interconnecting the sun gear of the second planetary gear set and the input member with the carrier member of the fourth planetary gear set;

providing a first torque transmitting device to selectively interconnect the input member, the sun gear of the second planetary gear set and carrier member of the fourth planetary gear set with the carrier member of the second planetary gear set;

providing a second torque transmitting device to selectively interconnect the carrier member of the second planetary gear set with the ring gear of the first planetary gear set and the sun gears of the third and fourth planetary gear sets;

providing a third torque transmitting device to selectively interconnect the carrier member of the third planetary gear set and the output member with the ring gear of the fourth planetary gear set;

providing a fourth torque transmitting device to selectively interconnect the carrier member of the second planetary gear set with a stationary portion of a housing of the transmission;

providing a fifth torque transmitting device to selectively interconnect the sun gear of the first planetary gear set with a stationary portion of the housing of the transmission;

providing a sixth torque transmitting device to selectively interconnect the ring gear of the third planetary gear set with a stationary portion of the housing of the transmission;

establishing a first forward speed ratio by selectively activating the second, the fifth and the sixth torque transmitting devices;

establishing a second forward speed ratio by selectively activating the first, the second and the sixth torque transmitting devices;

establishing a third forward speed ratio by selectively activating the first, the fifth and the sixth torque transmitting devices;

establishing a fourth forward speed ratio by selectively activating the second, the third and the sixth torque transmitting devices wherein the third and sixth torque transmitting devices transmit torque and the second torque transmitting device carries zero torque;

establishing a fifth forward speed ratio by selectively activating the first, the third and the fifth torque transmitting devices;

establishing a sixth forward speed ratio by selectively activating the first, the second and the third torque transmitting devices;

establishing a seventh forward speed ratio by selectively activating the second, the third and the fifth torque transmitting devices;

establishing an eighth forward speed ratio by selectively activating the second, the third and the fourth torque transmitting devices;

establishing a ninth forward speed ratio by selectively activating the third, the fourth and the fifth torque transmitting devices; and establishing a reverse speed ratio by selectively activating the fourth, the fifth and the sixth torque transmitting devices.

\* \* \* \* \*